Patented July 3, 1951

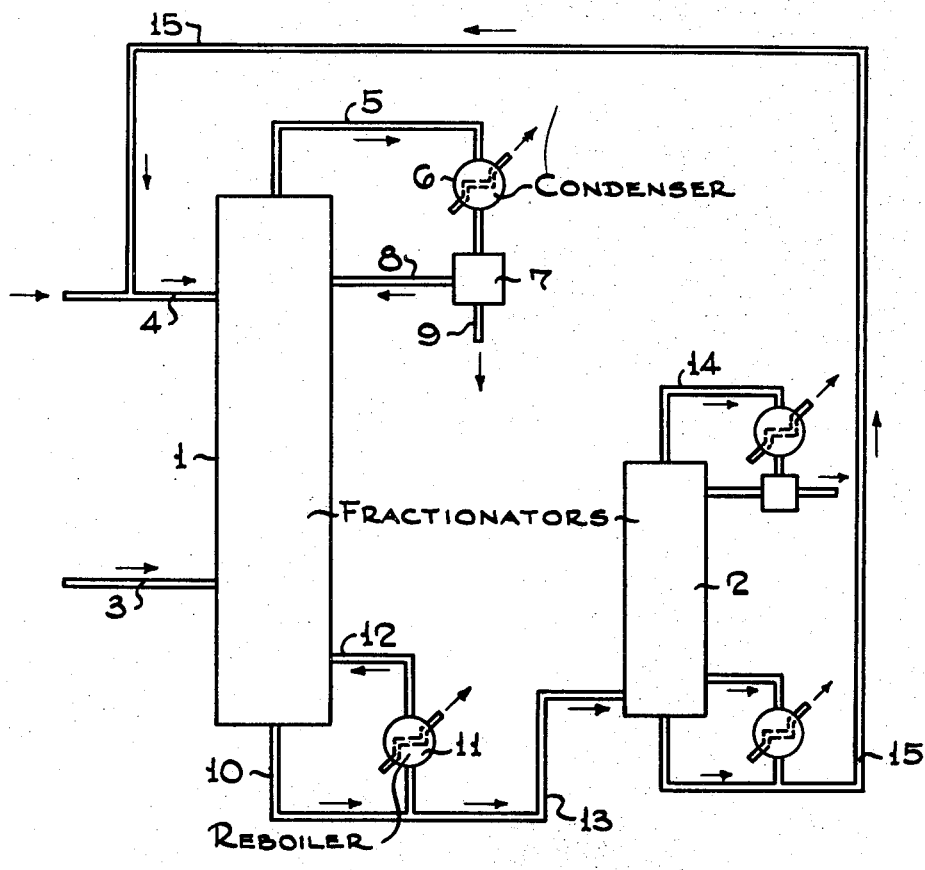

2,559,519

UNITED STATES PATENT OFFICE 2,559,519

EXTRACTIVE DISTILLATION OF ALCOHOLS WITH GLYCOL ETHERS

Paul V. Smith, Jr., Westfield, and Carl S. Carlson, Elizabeth, N. J., assignors to Standard Oil Development Company, a corporation of Delaware Application May 1, 1948, Serial No. 24,496

14 Claims. (Cl. 202—39.5)

This invention relates to a practical method of separating close-boiling oxygenated organic compounds and is concerned with the controlled use of a relatively high-boiling glycol-ether as a refluxing medium in a continuous fractional distillation of the close-boiling oxygenated compounds.

In copending application, Serial No. 768,440, filed August 13, 1947, it is proposed to fractionate close-boiling oxygenated compounds by fractionally distilling the oxygenated compounds in the presence of a large excess of a hydrocarbon oil which is liquid under the conditions obtaining in the fractionation zone. In such a system the volatilities of the compounds are altered to such an extent that separations are possible which are difficult to obtain by ordinary fractionation.

There are, however, a number of disadvantages in employing straight hydrocarbons as a reflux medium in separating such oxygenated compounds. In the first place, solubility relationships are such that only small amounts of water can be present without separation of two liquid phases. Such liquid phase separation is generally quite undesirable in such systems since it results in loss of selectivity. Furthermore, in order to prevent entrainment of the hydrocarbon overhead with the alcohol products, both in the fractionation stage and in the subsequent stage of stripping the alcohol from the hydrocarbon, it is necessary to use a hydrocarbon of relatively high initial boiling point. This high initial boiling point of the hydrocarbon results in high tower temperatures and in the necessity for using large amounts of high pressure steam for reboiling.

It is, therefore, an object of this invention to provide a commercially feasible process for the efficient separation of close-boiling oxygenated compounds which are difficult to separate by ordinary fractional distillation methods, while avoiding the difficulties of limited miscibility and high boiling point encountered when using hydrocarbons as the refluxing medium.

The objects of this invention are accomplished by fractionating the mixture of close-boiling oxygenated compounds in the presence of a large excess of a glycol-ether.

The process of this invention is best applied to distillation cuts or mixtures, the components of which distill within a narrow range; however, it may be applied to wide-boiling mixtures as well. The invention is particularly directed to the separation of alcohols of different types and molecular weights from one another and to the separation of alcohols as a class or one particular alcohol from other oxygenated compounds such as ketones, acetals, esters, aldehydes, etc., and is useful preferably in separating between compounds boiling in the range of normal propyl alcohol, secondary butyl alcohol and higher boiling compounds. Lower boiling mixtures cannot be separated without encountering reversal of volatility. For example, a mixture of ethanol and isopropanol cannot be separated by the present invention without rendering isopropanol more volatile than ethanol. Typical separations which can be made are n-propyl alcohol from sec-butyl alcohol, n-propyl alcohol from i-butyl alcohol, n-propyl alcohol from a mixture of sec-butyl and i-butyl alcohols, n-propyl alcohol from ethyl butyl ketone, n-propyl alcohol from valeraldehyde, n-propyl alcohol from a mixture of $C_4$ and higher molecular weight alcohols, n-propyl alcohol from a mixture of $C_5$ and higher molecular weight carbonyl compounds, and n-butyl alcohol from isomeric $C_5$ and higher alcohols.

The crude oxygenated mixture may contain amounts of water greater than, less than, or equal to the amounts corresponding to azeotropic compositions, but in any case it must be miscible with the solvent in all portions of the fractionation zone.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, especially when the aqueous layer product formed contains not only lower primary and secondary alcohols but also various ketones, aldehydes, ethers, acetals, esters, carboxylic acids and certain tertiary alcohols. Still another source is in the products of hydrocarbon oxidation where both oil and water layers are obtained, each containing oxygenated organic compounds. Narrow-boiling range mixtures which may be obtained by the ordinary distillation processes from aqueous solution are as follows:

TABLE I

| Group | Components | Normal B. Pt., °C. |
|---|---|---|
| I | n-Propyl Alcohol | 97.8 |
|   | s-Butyl Alcohol | 99.5 |
| II | n-Propyl Alcohol | 97.8 |
|   | s-Butyl Alcohol | 99.5 |
|   | i-Butyl Alcohol | 107.3 |
| III | n-Propyl Alcohol | 97.8 |
|   | s-Butyl Alcohol | 99.5 |
|   | Methyl Butyl Ketone | 127.2 |
| IV | n-Butyl Alcohol | 117.7 |
|   | sec-Amyl Alcohol | 119.2 |

The narrow-boiling range mixture may be a binary or tertiary mixture as in the groups shown, but generally the crude mixtures contain additional oxygenated organic compounds, which do not interfere with the basic operation of this invention in isolating the principal alcohol components of the mixtures.

A typical crude propanol cut obtained from the water layer of a Fischer synthesis process contains the following:

TABLE II

*Normal propanol cut*

| Component | Normal Boiling Pt. | Binary Water Azeotrope B. Pt., °C. |
|---|---|---|
| Ethanol | 78.5 | 78.1 |
| Isopropanol | 82.4 | 80.4 |
| n-Propanol | 97.8 | 87.7 |
| sec-Butanol | 99.5 | 87.5 |
| iso-Butanol | 107.3 | 89.9 |
| n-Butanol | 117.7 | 92.2 |
| tert-Butanol | 82.8 | 79.9 |
| iso-Propyl Acetate | 89.4 | [1] 75.5 |
| n-Propyl Acetate | 101.6 | 82.4 |
| Methyl Ethyl Ketone | 79.6 | 74.8 |
| Methyl n-Propyl Ketone | 102.3 | 82.9 |
| Methyl iso-Propyl Ketone | 94.3 | |
| Diethyl Ketone | 102.0 | |
| Methyl iso-Butyl Ketone | 116.8 | |
| Ethyl Propionate | 99.1 | 81.2 |
| iso-Valeraldehyde | 92.5 | 82 |
| n-Valeraldehyde | 103.7 | 80.6 |
| Methyl n-Butyl Ketone | 127.2 | |

[1] Ternary with ethyl alcohol.

In the above cut, the kinds and relative quantities of the components vary greatly but the major components are propanol, secondary butanol and methyl normal butyl ketone. When this cut is distilled from aqueous solution, many of the compounds form azeotropes with water and with themselves with the result that the boiling points are brought so close together that separation is very difficult to achieve. The difficulties encountered can be appreciated by reference to Table II which shows the overlapping of the anhydrous and binary aqueous azeotrope boiling points.

To obtain the desired separation of purified organic components from mixtures like that mentioned with benefits of the present invention, the mixture is subjected to a continuous fractional distillation in a column of practical size, including a primary rectification zone, a secondary rectification zone above the primary zone, and a stripping zone below the primary zone for countercurrent vapor liquid contact under reboiling and refluxing conditions. A sufficiently large quantity of a glycol-ether is introduced at the upper part of the primary rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the large quantity of glycol-ether to the upper part of the rectification zone. The temperature of the glycol-ether introduced into the primary rectification zone is preferably close to the temperature of the liquid on its feed plate, although it may be lowered to partially condense vapors ascending to the solvent feed plate.

Since the efficient operation is essentially continuous, the glycol-ether is added continuously near the top of the primary rectification zone of the column while the mixture of oxygenated organic compounds to be separated is fed continuously into the column at a lower point while sufficient heat is provided to afford distillation throughout the column.

The feed stream of the oxygenated organic compounds is preferably introduced into the fractionating column between the primary rectification zone and the lower stripping zone at a point where the ratio of the main organic compounds to be separated in the feed is similar to the ratio of these compounds in the internal reflux descending through the column.

The feed stream is preferably preheated to a temperature close to that of the internal liquid reflux under practically equilibrium boiling conditions at the point of introduction. The preheated feed stream may be liquid, partially vaporized, or completely vaporized when introduced into the fractionating column.

Vapors of the organic compounds introduced as a feed stream at the bottom part of the primary rectification zone in the fractionating column pass up through the primary rectification zone in contact with descending internal liquid reflux under practically equilibrium reboiling and refluxing conditions. The secondary rectification zone serves to strip glycol-ether from the overhead vapors.

The quantity of glycol-ether required to be introduced continuously at the upper part of the primary rectification zone for accomplishing the desired separation of the close-boiling compounds is considerably greater than the quantity of condensate with which it becomes homogeneously mixed. This is necessary in order to make the glycol-ether concentration of the internal reflux substantially above a critical minimum in the range of 70–99 volume percent. With adequate glycol-ether concentration in the internal reflux for effecting the separation, the organic component to be isolated in the bottoms is dissolved in the internal reflux that reaches the bottom part of the primary rectification zone and finally the bottom of the stripping zone.

The minimum concentration in the internal reflux of the glycol-ether for obtaining the separation depends on the particular organic compounds to be separated and varies between 70 and 99 volume percent. In a limiting case of isolating n-propyl alcohol from sec-butyl alcohol, essentially no separation is effected if the internal reflux contains less than 80 volume per cent glycol-ether, and for obtaining satisfactory results on a practical scale, more than 90 volume percent glycol-ether, preferably 90–99 volume percent, is required in the internal liquid reflux. As the dilution of the internal reflux becomes infinite, the selectivity of separation is increased but the operating efficiency is excessively lowered on account of the relatively small quantities of the oxygenated organic compounds being processed.

Under steady state conditions existing in a continuously operating fractional distillation zone, the internal reflux having adequate concentration for accomplishing the separation of the close-boiling alcohols and other oxygenated compounds, there tends to be a nearly constant glycol-ether concentration in the homogeneous liquid phase on each plate above the feed point and on each plate below the feed point although the average concentration on the plates above and below the feed point may differ. This internal reflux in flowing from the top to the bottom becomes richer in the oxygen compounds having the lowest relative volatility in the presence of the glycol-ether while the oxygen compounds having the highest relative volatility in the glycol-ether are distilled overhead.

The overhead vapors from the secondary rectification zone are enriched in one or more of the organic components rendered relatively more volatile by concentration of the glycol-ether in the liquid reflux while the remaining portion of the organic material introduced with the feed remains dissolved in the internal reflux. For example, in distilling an aqueous mixture of two alcohols, the distillation may be carried out so that either one of the alcohols is obtained free of the other. In separating n-propanol from secondary butanol the distillation may be conducted so that n-propanol is obtained overhead and a mixture of n-propanol and sec-butanol is obtained in the bottoms or a portion of the secondary butanol may be taken overhead with the n-propanol so that secondary butanol free of n-propanol is obtained in the bottoms.

The functioning of the stripping zone may be described as follows:

The mixture of the close-boiling alcohols and other oxygenated compounds to be separated, as in the liquid reflux from the bottom of the rectification zone, flows downwardly through the stripping zone in countercurrent contact with ascending vapors evolved from the solution under reboiling conditions. A sufficiently high concentration of glycol-ether is maintained in the liquid flowing down through the stripping zone, as in the rectification zone, to make the liquid progressively richer in oxygenated compounds having the lowest relative volatility in the glycol-ether while the oxygenated compounds having the highest relative volatility in the glycol-ether are stripped from the liquid. Under practically equilibrium reboiling and refluxing conditions for complete stripping in the stripping zone, the organic compounds rendered more volatile may be removed as vapor overhead from the stripping zone at the same rate that they enter the stripping zone as part of the liquid feed to this zone and a solution of the organic compounds rendered less volatile freed of the more volatile compounds in the liquid may be withdrawn from a bottom part of the stripping zone.

Suitable glycol-ethers to be used in the process of the present invention include monomethyl ether of ethylene glycol, the mono-ethyl ether of ethylene glycol, the n-propyl ether of ethylene glycol, the isopropyl ether of ethylene glycol, the monobutyl ether of ethylene glycol, the monomethyl ether of diethylene glycol, the monoethyl ether of diethylene glycol, the mono-normal propyl ether of diethylene glycol, the monoisopropyl ether of diethylene glycol, the monobutyl ether of diethylene glycol, the diethyl ether of ethylene glycol, the diethyl ether of diethylene glycol, the dibutyl ether of ethylene glycol, the dibutyl ether of diethylene glycol, dimethoxy tetraglycol, dibutoxytetraglycol, and the corresponding derivatives of propylene glycol or polypropylene glycols.

In the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principles of the invention may be employed.

This invention will be described in detail as applied to the separation of n-propyl alcohol and sec-butyl alcohol from aqueous solution.

Referring to the drawing, a feed fraction is introduced by line 3 into tower 1 where it is fractionated in the presence of a liquid stream of a glycol-ether introduced through line 4, at a point several plates below the top of the tower. The conditions in the tower are such as to cause a distillation of the alcohol compounds in the presence of the glycol-ether on each plate of the tower. A sufficient amount of the glycol-ether is added so that it is present to the extent of 90 volume percent on each plate. As the vapors of the feed pass up the column some of them are dissolved in the large excess of glycol-ether descending the column and are collected together with the glycol-ether in pools on each plate. Conditions are maintained on each plate of the tower such that the liquid mixtures of the n-propyl and sec-butyl alcohols are at their boiling points and are continuously being contacted with vapors boiled from the plates below. Because of the enhanced volatility of the n-propyl alcohol in relation to the sec-butyl alcohol the vapors are relatively rich in the former and poor in the latter. By maintaining the amount of glycol-ether on each plate so large that infinite dilution is approached, the optimum relative volatilities for the separation of the desired components can be secured. Furthermore, by controlling the amount of oxygenated compound reflux and consequently the reflux ratio and the number of plates, the actual degree of separation may be varied until the desired product purity and recovery are obtained. Thus, suitable temperature and reflux conditions are maintained in the tower so that substantially pure n-propyl alcohol appears in the overhead stream and a solution of sec-butyl alcohol in glycol-ether appears in the bottoms product. The plates above the point of glycol-ether entry serve to strip glycol-ether from the alcohol overhead. Any water present in the feed will appear with the overhead alcohol product.

Overhead vapors consisting substantially of pure n-propanol and all the water entering with the feed are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product.

Bottoms liquid consisting of a solution of sec-butyl alcohol in glycol-ether collected at the lower part of column 1 is passed by line 10 into reboiler 11 for heating by indirect or direct heat exchange with a heating medium such as live steam. A portion of the bottoms liquid heated and partially vaporized in the reboiler 11 is recycled by line 12 to the lower part of column 1. The remaining portion is withdrawn through line 13 to tower 2 where sec-butyl alcohol is separated from the glycol-ether and removed overhead through line 14. Glycol-ether is removed from the bottom of the tower through line 15 and recycled to tower 1.

Representative data are given in the following tables showing the application of this invention to the separation of ethanol and isopropanol and of normal propanol and secondary butanol. The relative volatility given in the table is the volatility of one component divided by that of the other, the volatility of each component being proportional to its partial pressure divided by its mol fraction in the liquid phase. It is also defined by the equation alpha $=(y_1/y_2)/(x_1/x_2)$ where $y$ refers to the vapor phase mol fractions of the components to be separated and $x$ refers to the liquid phase mol fractions of the components to be separated, subscript one designates the more volatile component and subscript two the less volatile component.

TABLE III

*Relative volatility of EtOH to IpOH*

| Run No. | 1 | 2 | 3 | 4 | 5 |
|---|---|---|---|---|---|
| Charge: | | | | | |
| Mol percent EtOH) }Binary | 80 | 80 | 20 | 80 | 20 |
| Mol percent IpOH) }Basis | 20 | 20 | 80 | 20 | 80 |
| Vol. percent Butyl Cellosolve | 90 | 80 | 80 | 70 | 70 |
| Vapor Sample: | | | | | |
| Mol percent EtOH | 78.9 | 80.6 | 21.8 | 79.8 | 24.2 |
| Mol percent IpOH | 21.1 | 19.4 | 78.2 | 20.2 | 75.8 |
| Liquid Sample: | | | | | |
| Mol percent EtOH | 80.3 | 79.1 | 19.6 | 80.1 | 17.8 |
| Mol percent IpOH | 19.7 | 20.9 | 80.4 | 19.9 | 82.2 |
| Relative Volatility of EtOH to IpOH | 0.917 | 1.10 | 1.14 | 0.981 | 1.48 |

Normal volatility in absence of solvent: EtOH over IpOH, 1.15.
NOTE: EtOH=ethyl alcohol; IpOH=isopropyl alcohol; Butyl Cellosolve=monobutyl ether of ethylene glycol.

TABLE IV

*Relative volatility of ethanol to isopropanol*

| Run No. | 6 | 7 | 8 | 9 | 10 |
|---|---|---|---|---|---|
| Charge: | | | | | |
| Mol Per Cent EtOH }Binary Basis | 80 | 80 | 20 | 80 | 20 |
| Mol Per Cent IpOH | 20 | 20 | 80 | 20 | 80 |
| Vol. Per Cent Ethyl Carbitol¹ | 90 | 80 | 80 | 70 | 70 |
| Vapor Sample: | | | | | |
| Mol Per Cent EtOH | 78.8 | 77.6 | 16.7 | 78.3 | 18.4 |
| Mol Per Cent IpOH | 21.2 | 22.4 | 83.3 | 21.7 | 81.6 |
| Liquid Sample: | | | | | |
| Mol Per Cent EtOH | 79.6 | 81.0 | 22.1 | 80.7 | 20.7 |
| Mol Per Cent IpOH | 20.4 | 19.0 | 77.9 | 19.3 | 79.3 |
| Relative Volatility of EtOH to IpOH | 0.953 | 0.812 | 0.707 | 0.863 | 0.865 |

Normal volatility in absence of solvent: EtOH over IpOH, 1.15.
¹ NOTE: Ethyl carbitol=monoethyl ether of diethylene glycol.

TABLE V

*Relative volatility of normal propanol to secondary butanol*

| Run No. | 11 | 12 | 13 | 14 |
|---|---|---|---|---|
| Charge: | | | | |
| Mol Per Cent n-PrOH }Binary Basis | 70 | 80 | 70 | 80 |
| Mol Per Cent sec-BuOH | 30 | 20 | 30 | 20 |
| Vol. Per Cent Monobutyl ether of ethylene glycol | 90 | 90 | | |
| Vol. Per Cent Monoethyl ether of diethylene glycol | | | 90 | 90 |
| Vapor Sample: | | | | |
| Mol Per Cent n-PrOH | 78.9 | 87.4 | 77.6 | 85.8 |
| Mol Per Cent sec-BuOH | 21.1 | 12.6 | 22.4 | 14.2 |
| Liquid Sample: | | | | |
| Mol Per Cent n-PrOH | 62.8 | 73.8 | 63.7 | 75.2 |
| Mol Per Cent sec-BuOH | 37.2 | 26.2 | 36.3 | 24.8 |
| Relative Volatility of n-PrOH over sec-BuOH | 2.21 | 2.46 | 1.97 | 1.99 |

Normal volatility in absence of solvent: n-PrOH over sec-BuOH, 1.05.

From the above data it is evident that the compounds of this invention are not suitable for the separation of ethanol from isopropanol due to the reversal of volatility but that the invention finds utility in separating normal propanol from higher boiling compounds.

The nature and objects of the present invention having been thus fully set forth and specific examples of the same given, what is claimed as new and useful and desired to be secured by Letters Patent is:

1. The method of separating lower and higher molecular weight saturated monohydric alcohols containing 3 to 5 carbon atoms per molecule and having normal boiling points above that of isopropanol and which form close-boiling mixtures difficult to separate by ordinary fractional distillation, which comprises continuously introducing a feed mixture of said alcohols to a fractional distillation zone wherein vapors of said alcohols ascend counter-currently to liquid reflux of the alcohols dissolved in 70–99 volume per cent of a glycol ether to effect vaporization of lower molecular weight alcohol continuously removing vapor of lower molecular weight alcohol overhead from the fractional distillation zone, and removing a solution of higher molecular weight alcohol in the glycol ether as bottoms.

2. A process according to claim 1 in which the alcohols are aqueous alcohols.

3. A process according to claim 1 in which the alcohol mixture comprises n-propanol and sec-butanol and in which a mixture of n-propanol and sec-butanol is removed overhead and a solution of sec-butanol alcohol in the glycol ether is removed as bottoms.

4. A process according to claim 1 in which the alcohol mixture comprises n-propanol and sec-butanol and in which normal propyl alcohol is removed overhead and a solution of normal propyl alcohol and secondary butyl alcohol in the glycol ether is removed as bottoms.

5. In a process of separating aqueous azeotropic mixtures of lower and higher molecular weight saturated monohydric alcohols containing 3 to 5 carbon atoms per molecule and having normal boiling points above that of isopropanol and which form close-boiling mixtures difficult to separate by ordinary fractional distillation, the steps which comprise continuously passing vapors of said alcohols up through a primary rectification zone wherein the alcohol vapors ascend in contact with a countercurrent internal reflux comprising condensate from said vapors containing 70–99 volume per cent of a glycol ether, continuously introducing said glycol ether into the condensate at an upper part of the primary rectification zone, continuously passing from said primary rectification zone into a secondary rectification zone the vapor of one of said alcohols volatilized to a greater extent than another of said alcohols having a higher molecular weight by the increased glycol ether content of the internal reflux wherein said vapors are further rectified to condense accompanying glycol ether vapors, continuously returning glycol ether vapors condensed in said secondary rectification zone to said primary rectification zone and continuously withdrawing from the top of the secondary rectification zone free glycol ether, water vapor and lower molecular weight alcohol and continuously withdrawing from a bottom part of said primary rectification zone internal reflux which is a solution of said higher molecular weight alcohols in the glycol ether.

6. A process of separating aqueous azeotropic mixtures of lower and higher molecular weight saturated monohydric alcohols containing 3 to 5 carbon atoms per molecule and having normal boiling points above that of isopropanol and which are difficult to separate by ordinary fractional distillation, which comprises continuously introducing a feed mixture of the alcohols to a rectification zone wherein vapors of the feed mixture ascend countercurrently in contact with a liquid reflux comprising condensate from said vapors containing 70-99 volume per cent of a glycol ether, increasing the glycol ether content of the condensate at an upper part of the rectification zone by introducing glycol ether continuously thereto in excess of the amount of glycol ether leaving said zone as vapor, introducing internal liquid reflux from a bottom part of the rectification zone to a stripping zone, passing said reflux in countercurrent contact with vapors boiled from the internal liquid reflux as it flows down to a bottom part of the stripping zone, withdrawing from the top part of the rectification zone water and lower molecular weight alcohol, withdrawing from the bottom part of the stripping zone an anhydrous solution of higher molecular weight alcohol dissolved in the glycol ether.

7. A process as in claim 6 in which the glycol ether is the monobutyl ether of ethylene glycol and in which its content in the internal reflux is 80-99 volume per cent.

8. In a process of separating aqueous azeotropic mixtures of n-propyl alcohol and sec-butyl alcohol, the steps which comprise continuously passing a solution of n-propyl alcohol in a glycol ether containing sec-butyl alcohol down through a stripping zone so that a liquid portion of the solution flows countercurrently in contact with vapors evolved therefrom under constant refluxing and reboiling conditions, maintaining a glycol ether content of 80-99 volume per cent in the resulting internal reflux to effect vaporization of a larger part of the n-propyl alcohol than of the sec-butyl alcohol in said reflux, continuously withdrawing vapors of alcohols and water overhead from the stripping zone, the n-propyl alcohol being thus withdrawn as vapor at essentially the same rate that the n-propyl alcohol dissolved in said glycol ether enters the stripping zone, and withdrawing from a bottom part of the stripping zone a solution of sec-butyl alcohol in the glycol ether substantially free of n-propyl alcohol and water.

9. A process according to claim 8 in which the glycol ether is the monobutyl ether of ethylene glycol, and in which its content in the internal liquid reflux is 90-99 volume per cent.

10. A process according to claim 8 in which the glycol is the monoethyl ether of diethylene glycol.

11. In a process of separating normal propyl alcohol from its aqueous mixtures with saturated monohydric higher-boiling alcohols containing up to 5 carbon atoms per molecule the steps which comprise continuously passing a solution of a mixture of normal propyl alcohol and higher alcohols in a glycol ether down through a stripping zone so that a liquid portion of the solution flows countercurrently in contact with vapors evolved therefrom under constant refluxing and reboiling conditions, maintaining a glycol ether content of 80-99 volume per cent in the resulting internal reflux to effect vaporization of a larger part of the normal propyl alcohol than of the higher-boiling alcohols in said reflux, continuously withdrawing vapors of normal propyl alcohol and water overhead from the stripping zone, the normal propyl alcohol being thus withdrawn as vapor at essentially the same rate that the normal propyl alcohol dissolved in said glycol ether enters the stripping zone and withdrawing from a bottom part of the stripping zone a solution of said higher-boiling alcohols in the glycol ether substantially free of normal propyl alcohol and water.

12. A process according to claim 11 in which the glycol ether is the monobutyl ether of ethylene glycol and in which its content in the internal liquid reflux is 90-99 volume per cent.

13. A process according to claim 11 in which the glycol ether is the monoethyl ether of diethylene glycol.

14. A process according to claim 11 in which the higher-boiling alcohols are alcohols having 4 carbon atoms per molecule.

PAUL V. SMITH, Jr.
CARL S. CARLSON.

REFERENCES CITED

The following references are of record in the file of this patent:

UNITED STATES PATENTS

| Number | Name | Date |
| --- | --- | --- |
| 2,273,923 | Bludworth | Feb. 24, 1942 |
| 2,339,576 | Luten | Jan. 18, 1944 |

FOREIGN PATENTS

| Number | Country | Date |
| --- | --- | --- |
| 563,164 | Great Britain | Aug. 1, 1944 |